July 7, 1925.
G. CONSTANTINESCO
POWER TRANSMISSION
Filed Jan. 26, 1924
1,545,401
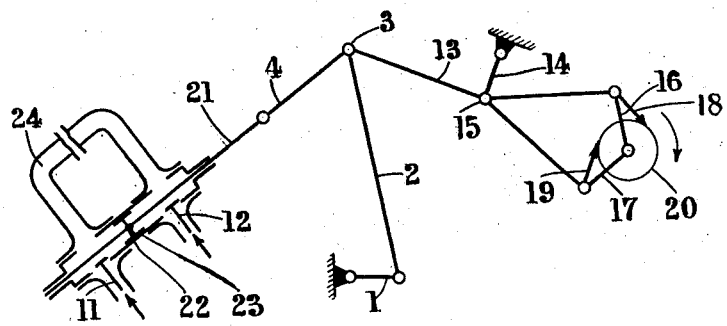
INVENTOR
G. CONSTANTINESCO,
BY
ATTORNEY Patented July 7, 1925.

1,545,401

UNITED STATES PATENT OFFICE.

GEORGE CONSTANTINESCO, OF WEYBRIDGE, ENGLAND.

POWER TRANSMISSION.

Application filed January 26, 1924. Serial No. 688,790.

*To all whom it may concern:*

Be it known that I, GEORGE CONSTANTINESCO, a subject of the King of Great Britain and Ireland, residing at "Carmen Sylva," Beechwood Avenue, Oatlands Park, Weybridge, in the county of Surrey, England, have invented certain new and useful Improvements in Power Transmissions, of which the following is a specification.

The present invention relates to a method and apparatus for transmitting power from a steady rotating shaft to a shaft which is to be rotated against a variable resisting torque.

In my British patent specifications Nos. 185,022 and 218,406, I have described various methods of and apparatus for transmitting power from a prime mover or other steadily rotating shaft to a shaft which is to be rotated against a variable resisting torque by splitting the alternating motion derived from the steadily rotating shaft into two components, one of these components being caused to oscillate a mass about a mean position, while the other is caused to impart motion in one direction through unidirectional driving devices to a driven shaft.

In the apparatus which I have previously described in the said specifications, one component of the motion transmitted from the driving shaft has been transmitted to an oscillating or reciprocating mass consisting of a solid body, for example, an oscillating flywheel.

In some cases, however, it may be convenient to utilize a column of liquid instead of a solid body to provide the inertia.

The present invention consists in a method and means for transmitting power from a driving shaft to a shaft which is to be rotated against a variable resisting torque by splitting the alternating motion derived from a steady rotating shaft into component alternation motions, one component motion being caused to give alternating motion to a mass, while another is caused to actuate unidirectional driving devices acting on the driven shaft, the mass actuated by the first component consisting of a column of liquid of suitable length.

The invention also consists in varying the length of the liquid column by means of a telescopic tube in order to vary the inertia of the mass.

The invention further consists in constructing the apparatus as a polyphase system in which two or more impulses differing in phase may be given to the rotor at each oscillation, the different phases being interconnected by interconnecting suitable points in the liquid columns which provide the inertia.

The invention also consists in the use of a liquid column to provide the inertia in apparatus such as described by my British patent specifications Nos. 185022, 206204 and 218406.

The invention further consists in the improved means for transmitting power from a steadily rotating shaft to a rotor hereinafter described.

In carrying the invention into effect according to the example diagrammatically illustrated in the drawing; in order to transmit power from a steadily rotating driving shaft to a rotor which has to be rotated against a variable resisting torque, the crank 1 of the driving shaft is connected by a connecting rod 2 to a pivot 3 to which is attached a connecting rod 4 connected to the piston rod 21 of a double acting piston 22 working in a cylinder 23. The ends of the cylinder are in communication through a pipe 24, the whole space in the cylinder heads and the pipe connecting the heads being kept full of liquid from a reservoir through non-return valves 11, 12 or other suitable means. The liquid column in this pipe 24 forms the inertia. The pivot 3 of the driving connecting rod 4 is also connected by a rod 13 to a pivot 15 on a stabilizing link 14 as shown in my British patent specification No. 22986 of 1923 swinging about a fixed point and the pivot 15 is also connected to a pair of oscillating members 16, 17 carrying unidirectional driving devices 18, 19 actuating the rotor.

It will be seen that this arrangement is equivalent to that described in my British patent specification No. 206204, the liquid column between the ends of the cylinders acting as the equivalent of the oscillating mass described in the said specifications.

In order to vary the inertia the length of the liquid column in the pipe 24 may be varied by using a telescopic U-shaped tube which can be adjusted as desired.

It will be seen that the arrangement above described may be applied in cases in which a floating lever is employed, the liquid column and cylinders being arranged so that they form the equivalent of the oscillating mass described in my patent specification No. 185022.

It will be seen that for a polyphase arrangement two or more liquid columns and sets of pistons and cylinders may be provided actuating ratchet devices disposed at suitable phase angles around a single rotor; the inertia columns being connected at their mean points if desired.

I claim—

1. Means for transmitting power from a steadily rotating driving shaft to a driven shaft which rotates under varying torque or speed, comprising in combination means for splitting the alternating motion derived from the steadily rotating shaft into two components in proportions depending on the torque opposed to the motion of the driven shaft, a liquid mass to which one component gives motion and unidirectional driving devices to which the other component gives motion.

2. Means for transmitting power from a steadily rotating driving shaft to a driven shaft which rotates under varying torque or speed, comprising in combination a link operatively connecting the prime mover to the junction of two other links, a piston actuated by one of these links and working in a cylinder, the ends of which are connected by a pipe, the pipe and cylinder forming a closed chamber which is filled with liquid, which liquid offers inertial resistance to the motion of the piston, and unidirectional driving mechanism actuated by the second of the two links.

3. Means for transmitting power from a steadily rotating driving shaft to a driven shaft which rotates under varying torque or speed, comprising in combination a link operatively connecting the prime mover to the junction of two other links, a piston actuated by one of these links and working in a cylinder, the ends of which are connected by a pipe, the pipe and cylinder forming a closed chamber which is filled with liquid, which liquid offers inertial resistance to the motion of the piston, means for varying the capacity of the chamber, and unidirectional driving mechanism actuated by the second of the two links.

In testimony whereof I affix my signature.

GEORGE CONSTANTINESCO.